United States Patent
Lin et al.

(10) Patent No.: US 10,694,390 B2
(45) Date of Patent: Jun. 23, 2020

(54) REGULATING ASSIGNMENT OF A WIRELESS LOCAL AREA NETWORK COMMUNICATION CHANNEL (71) Applicant: HEWLETT-PACKARD DEVELOPMENT COMPANY, L.P., Houston, TX (US)

(72) Inventors: I-Chen Lin, Taipei (TW); Han-Kuang Chang, Taipei (TW); Chen-Chung Chang, Taipei (TW); Thomas E Hofstede, Houston, TX (US); Angelino Ara, Dornach-Aschheim (DE); Leo J Gerten, Austin, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/092,077

(22) PCT Filed: Jul. 28, 2016

(86) PCT No.: PCT/US2016/044370
§ 371 (c)(1),
(2) Date: Oct. 8, 2018

(87) PCT Pub. No.: WO2018/022052
PCT Pub. Date: Feb. 1, 2018

(65) Prior Publication Data
US 2020/0015089 A1 Jan. 9, 2020

(51) Int. Cl.
H04W 16/12 (2009.01)
H04W 16/14 (2009.01)
(Continued)

(52) U.S. Cl.
CPC .......... *H04W 16/12* (2013.01); *H04W 16/14* (2013.01); *H04W 72/02* (2013.01);
(Continued)

(58) Field of Classification Search
None
See application file for complete search history.

(56) References Cited

U.S. PATENT DOCUMENTS 9,130,656 B2 9/2015 Linsky
9,241,370 B2 1/2016 Amini et al.
(Continued)

FOREIGN PATENT DOCUMENTS

CN 104469786 A 3/2015
WO WO-2007108769 A1 9/2007
(Continued)

*Primary Examiner* — Hong S Cho
(74) *Attorney, Agent, or Firm* — Trop, Pruner & Hu, P.C.

(57) ABSTRACT

A technique includes identifying a cellular communication frequency band and a wireless local area network communication channel being used by a wireless station. Based on the identified cellular communication frequency band and wireless local area network communication channel, assignment of the wireless local area network communication channel is regulated to inhibit interference due to the concurrent use of the cellular communication frequency band and the wireless local area network communication channel. The regulation of the assignment includes using the wireless station to determine whether to reassign the wireless local area network communication channel.

16 Claims, 5 Drawing Sheets (51) Int. Cl.
*H04W 72/02* (2009.01)
*H04W 72/04* (2009.01)
*H04W 84/12* (2009.01)
*H04W 88/06* (2009.01)
*H04W 72/08* (2009.01)

(52) U.S. Cl.
CPC ..... *H04W 72/0453* (2013.01); *H04W 72/082* (2013.01); *H04W 84/12* (2013.01); *H04W 88/06* (2013.01)

(56) References Cited

U.S. PATENT DOCUMENTS

| | | |
|---|---|---|
| 9,820,158 B2 * | 11/2017 | Chrisikos .............. H04W 16/14 |
| 9,826,423 B2 * | 11/2017 | Emmanuel ............ H04W 24/08 |
| 2013/0324112 A1 | 12/2013 | Jechoux |
| 2013/0324113 A1 * | 12/2013 | Jechoux ................ H04W 88/06 |
| | | 455/426.1 |
| 2015/0065157 A1 | 3/2015 | Homchaudhuri et al. |
| 2016/0174233 A1 | 6/2016 | Emmanuel |

FOREIGN PATENT DOCUMENTS

| | | |
|---|---|---|
| WO | WO-2011069119 A2 | 6/2011 |
| WO | WO 2012088270 A1 | 6/2012 |
| WO | WO-2012130175 A1 | 10/2012 |
| WO | WO-2012164328 A1 | 12/2012 |
| WO | WO-2016050807 A1 | 4/2016 |

\* cited by examiner

REGULATING ASSIGNMENT OF A WIRELESS LOCAL AREA NETWORK COMMUNICATION CHANNEL

BACKGROUND

A portable electronic device, such as a tablet or notebook computer, may communicate wirelessly with one or multiple networks. For example, the portable electronic device may have a radio to allow the device to communicate with a wireless local area network (WLAN) over communication channels governed by one of the Institute of Electrical and Electronics Engineers (IEEE) 802.11 specifications, commonly referred to as the WiFi communication protocols. The portable electronic device may also have a radio to allow the device to communicate with a cellular network.

DETAILED DESCRIPTION

A portable wireless station, such as a tablet computer, a smartphone, a notebook computer, and so forth, may have multiple radios for purposes of allowing the wireless station to communicate with multiple wireless networks. For example, the wireless station may have a cellular radio that operates in a cellular frequency band; and the wireless station may have other radios, such as WiFi and Bluetooth radios, that operate in one or multiple other frequency bands, such as frequency band(s) in the unlicensed industrial, scientific and medical (ISM) radio spectrum.

With multiple, concurrently operating radios, it is possible that the energy (harmonic energy, for example) that is generated by one radio may interfere with the reception of another radio. More specifically, there is an ever-increasing number of frequency channels being added for cellular communications. Although the frequency bands for cellular communications may be allocated in a manner to prevent interference with communications in non-cellular bands (a band in the ISM spectrum, for example), a given cellular band may nevertheless be dose enough to a non-cellular band to cause interference.

For example, a portable wireless station may have a wireless network interface card (WNIC) that has a wireless local area network (WLAN) radio to communicate with a WLAN using a legally-allowed frequency band, such as a band in the ISM spectrum or other band. In this manner, the WLAN radio may, for example, wirelessly communicate with the WLAN using signals that comply with the WiFi protocols that are set forth in the Institute of Electrical and Electronics Engineers (IEEE) 802.11n standard. The 802.11n standard, in general, uses two frequency bands within the ISM spectrum: a 2.4 GigaHertz (GHz) band and a 5 GHz band. The WLAN radio is assigned a channel frequency (designated by a channel number) within one of these frequency bands. For example, the WLAN radio may be assigned to channel 6 in the 2.4 GHz frequency band.

When the WLAN radio is assigned a channel in the 2.4 GHz frequency band, it is possible that the channel may be subject to interference that is generated by the operation of the wireless station's cellular radio. For example, the cellular radio may be assigned to Band 40 of the time division duplexing (TDD) mode of the Long Term Evolution (LTE) standard. LTE TDD Band 40, in turn, is adjacent in frequency to the WLAN 2.4 GHz frequency band. In this manner, LTE TDD Band 40 extends to 2400 MegaHertz (MHz), and the 2.4 GHz WLAN band begins at 2401 MHz. As a result, it is possible that with these assignments, the WLAN radio may be unable to reliably recover content due to operation of the cellular radio, or vice versa.

In accordance with example implementations that are described herein, a wireless station regulates a frequency channel and/or frequency band assignment of its WLAN radio for purposes of ensuring that its WLAN radio can coexist with its cellular radio without one radio interfering with the other.

Figure 1:
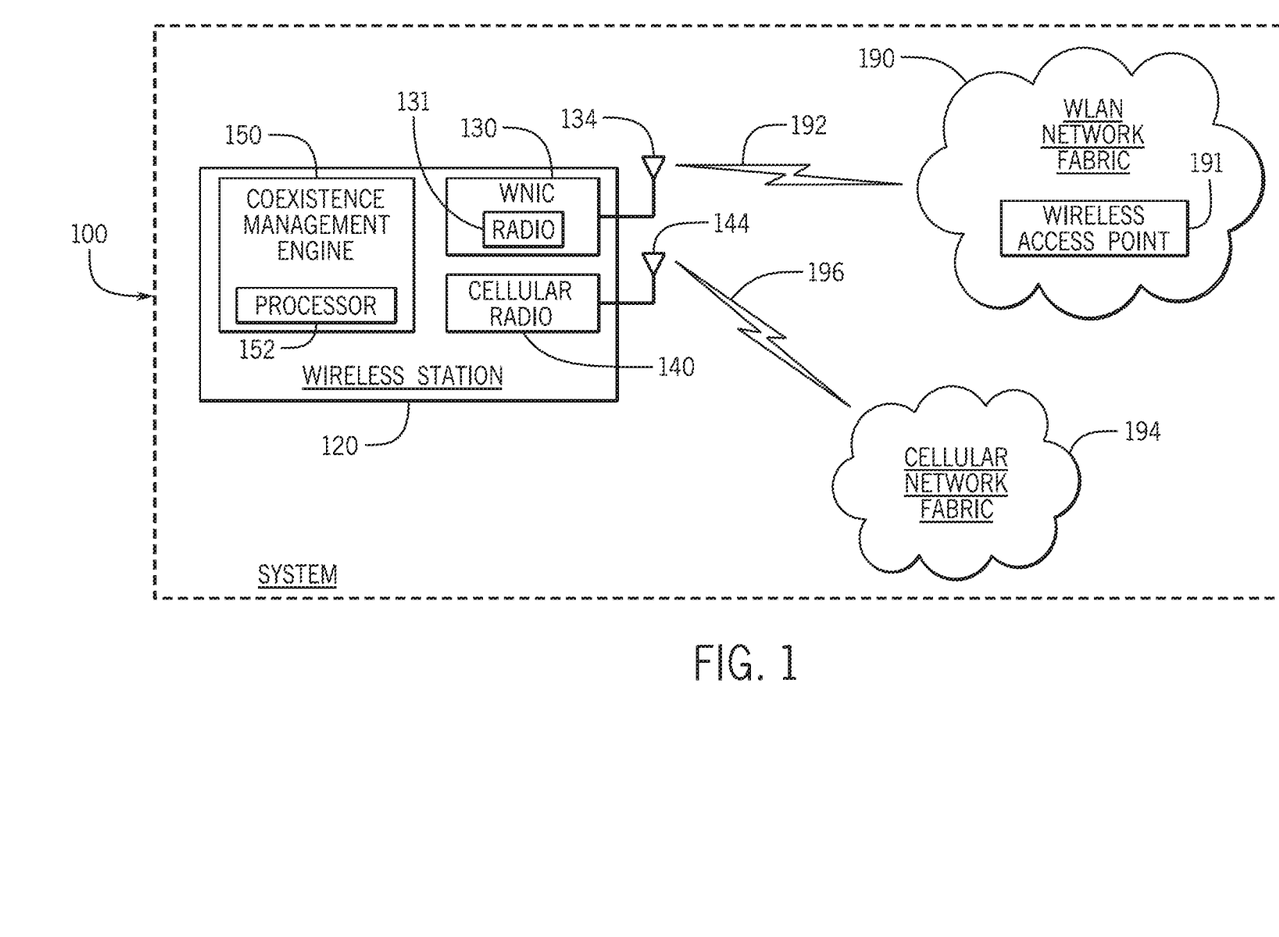
FIG. 1 is a schematic diagram of a system according to an example implementation.

Referring to FIG. 1, as a more specific example, in accordance with some implementations, a system 100 includes a wireless station 120. In accordance with some implementations, the wireless station 120 may be a portable electronic device, such as a tablet, a notebook computer, a smartphone, and so forth. As depicted in FIG. 1, the wireless station 120 may include wireless network interface, such as a wireless network interface card (WNIC) 130. The WNIC 130 includes a WLAN radio 131 and an antenna for purposes of wirelessly communicating (as depicting at reference numeral 192) with WLAN fabric 190.

As a more specific example, in accordance with some implementations, the WLAN radio 131 may communicate with WLAN fabric 190 using one of the IEEE 802.11 communication standards, commonly referred to as "WiFi." More specifically, in accordance with example implementations that are discussed herein, the WLAN radio 131 uses signaling that complies with the IEEE 802.11n protocol, which establishes two bands (a 2.4 GHz and a 5 GHz band) for the wireless communication 192. The WLAN radio may communicate in an ISM band or, in general in any other legally-allowed frequency hand. Depending on the particular implementation, the wireless communication 192 may be in an ad hoc mode or in an infrastructure mode. For the particular implementation depicted in FIG. 1, the WLAN radio 131 operates in the infrastructure mode to communicate with a wireless access point 191 of the WLAN network fabric 190.

In accordance with example implementations, the wireless station 120 includes one or multiple radios other than the WLAN radio 131, such as a cellular radio 140, which is coupled to an antenna 144 to communicate wirelessly (as depicted at reference numeral 196) with a cellular network fabric 194. For example implementations that are described herein, the cellular radio 140 communicates over an LTE cellular communication band, although other cellular communication bands (global system for mobile communications (GSM) bands, for example) may be used by the cellular radio 140 to communicate with the cellular network fabric 194, in accordance with further implementations.

The wireless station 120, in accordance with example implementations, includes a coexistence management engine 150, which regulates assignment of the WLAN channel for the WLAN radio 131 for purposes of preventing, or at least inhibiting, interference among the concurrently operating radios 131 and 140. In accordance with some implementations, the coexistence management engine 150 may include one hardware processor 152 (as depicted in FIG. 1) or multiple hardware processors 152.

In accordance with example implementations, the coexistence management engine 150 may assign the WLAN frequency band and/or may assign the WLAN frequency channel for the WLAN radio 131 based on the cellular frequency band that is assigned to the cellular radio 140. More specifically, in accordance with example implementations, the coexistence management engine 150 determines whether a WLAN channel that is currently assigned to the WLAN radio 131 can coexist with the frequency band that is currently assigned to the cellular radio 140. This determination may occur in response to the cellular radio 140 being assigned to a different frequency band, may occur as part of a periodic check by the coexistence management engine 150 to evaluate coexistence, may occur in response to another entity of the wireless station 120 reassigning the WLAN frequency channel, may occur in response to user action, and so forth, depending on the particular implementation. Regardless of the triggering event, the coexistence engine 150 may change the assignment of the WLAN channel if the engine 150 determines that the WLAN channel and the cellular communication frequency band cannot coexist (i.e., if the engine 150 determines that the WLAN radio 131 cannot reliably recover content received over the currently assigned WLAN channel due to interference from the cellular radio 140, or vice versa).

In accordance with example implementations that are described herein, the coexistence management engine 150 evaluates whether the currently assigned WLAN frequency channel can coexist with the currently assigned cellular communication frequency band based on the application of predetermined decision rules and not based on measurements of actual interference. However, in accordance with further example implementations, the coexistence management engine 150 may base at least part of the evaluation on one or multiple measurements and analysis of these measurements for purposes of assessing the degree of actual interference, if any.

Figure 2:
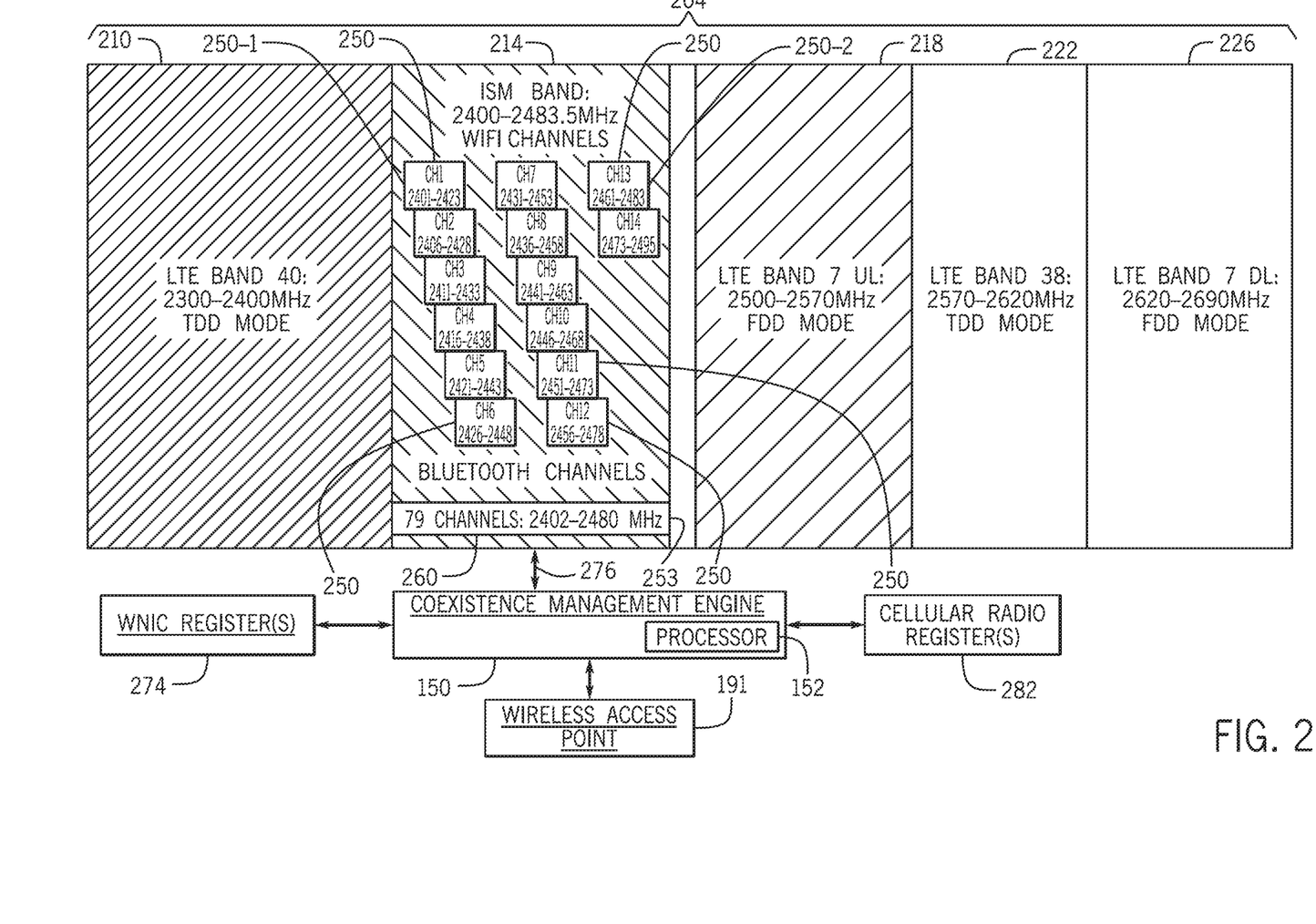
FIG. 2 is an illustration of the regulation of a wireless local area network (WLAN) channel by a wireless station according to an example implementation.

FIG. 2 is an illustration of a process that is used by the coexistence management engine 150 to regulate assignment of the WLAN frequency channel, in accordance with some implementations. In particular, FIG. 2 illustrates a spectrum 204, which includes potential LTE cellular frequency bands 210, 218, 222 and 226 that may be used by the cellular radio 140: and the spectrum 214 includes the 2.4 GHz WLAN band 214. In this manner, for this example, the 2.4 GHz band extends from 2400 to 2483.5 MHz and is part of the ISM spectrum. For the following examples, it is assumed that, when evaluated by the coexistence management engine 150, the WLAN radio 131 is assigned to a frequency channel 250 within the 2.4 GHz band 214. As depicted in FIG. 2, the 2.4 GHz band 214 contains fourteen frequency channels 250.

For example, the WLAN radio 131 may be assigned to channel 13 (shown at reference number 250-2) of the 2.4 GHz band 214. The coexistence management engine 150 may identify the assigned WLAN channel and the assigned WLAN frequency band by reading data from one or multiple registers 274 of the WNIC 130. Moreover, the coexistence management engine 150 may identify the assigned LTE frequency band by reading one or multiple registers 282 that are associated with the cellular radio 140.

As more specific example, the cellular radio may be assigned to LTE frequency division duplexing mode (FDD) mode Band 7 218, and the WLAN radio 131 may be assigned to channel 13 of the 2.4 GHz band 214. As depicted in FIG. 2, the LTE FDD Band 7 214 extends from 2500 to 2570 MHz, and channel 13 extends from 2460 to 2483 MHz. Due to the close proximity of channel 13 to the band 218, the coexistence management engine 150 may determine that channel 13 cannot coexist with the band 218 (i.e., the WLAN radio 131 cannot reliably recover content from channel 13 due to the operation of the cellular radio 140). The coexistence management engine 150 may then communicate with the wireless access point 191 to change the WLAN channel assignment. For this example implementation, the coexistence management engine 150 may attempt to assign the WLAN channel to the lowest available channel 250 within the 2.4 GHz band 214. For example, the coexistence management engine 150 may communicate with the wireless access point 191 to change the WLAN channel to channel 1 (shown at reference numeral 250-1) or at least assign the WLAN channel to a channel farther away from band 218 than currently assigned channel 13.

In a similar manner, if the cellular radio 140 is assigned to the LTE time divisional duplexing (TDD) band 40 210, which extends to a frequency near the lower boundary of the band 214, then the coexistence management engine 150 may reassign a WLAN channel within the 2.4 GHz band to be farther away from TDD band 40 210. For example, if the current WLAN channel is channel 1, then the coexistence management engine 150 may reassign the WLAN channel to channel 13 or at least assign the WLAN channel to a channel farther away from the band 210 than currently assigned channel 1.

In accordance with some implementations, the coexistence management engine 150 may have a preference to assign the WLAN channel to either channel 1, 6 or 11 within the 2.4 GHz band 214. For example, if the WLAN radio is assigned to either channel 1 or 6 in the 2.4 GHz band 214 and the cellular radio 140 is assigned to the LTE TDD band 40 210, then the coexistence management engine 150 may reassign the WLAN channel to channel 11. As another example, if the WLAN radio is assigned to either channel 6 or 11 in the 2.4 GHz band 214 and the cellular radio 140 is assigned to the LTE FDD band 7 218, then the coexistence management engine 150 may reassign the WLAN channel to channel 1.

In accordance with further implementations, the coexistence engine 150 may not have preferred WLAN channels, and in yet further implementations, the coexistence engine 150 may have different preferred channels. As examples, the coexistence engine 150 may prefer bands 1, 6 and 12; the coexistence engine 150 may prefer bands 1, 6 and 13; the coexistence engine 150 may prefer bands 1, 6 and 14; and so forth. The preferred bands, if any, may depend on legal regulations where the WLAN radio 131 is used, and any generally, the WLAN radio 131 may use any legally-allowed band.

In accordance with example implementations, instead of reassigning the WLAN communication frequency channel within the 2.4 GHz band 214, the coexistence management engine 150 may first attempt to reassign the WLAN radio 131 to another WLAN frequency band, such as the 5 GHz band. In this manner, if the 5 GHz band is unavailable, then the coexistence management engine 150 may reassign the frequency channel within the lower 2.4 GHz band.

Figure 3:
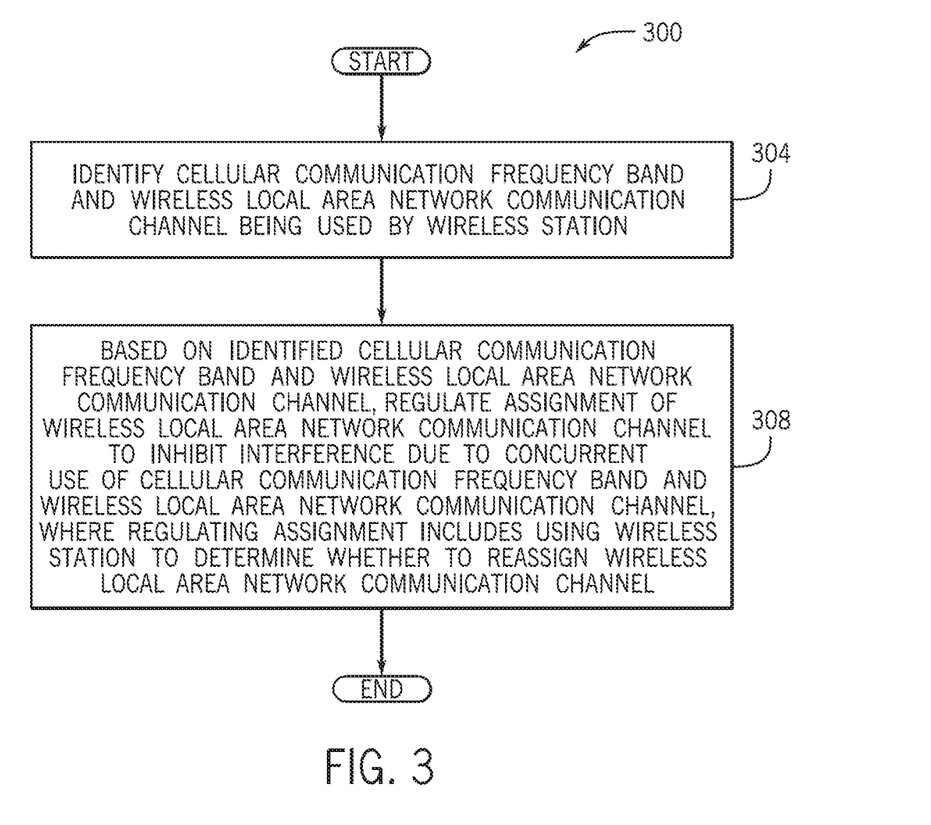
FIGS. 3 and 4 are flow diagrams depicting techniques to regulate assignment of a WLAN channel for a wireless station according to example implementations.

Referring to FIG. 3, thus, in accordance with example implementations, a technique 300 includes identifying (block 304) a cellular communication frequency band and a WLAN communication channel that is being by a wireless station. Based on the identified cellular communication frequency band and WLAN communication channel, the technique 300 includes regulating (block 308) assignment of the WLAN communication channel to inhibit interference due to concurrent use of the cellular communication frequency band and the WLAN communication channel, including using the wireless station to determine whether to reassign the WLAN communication channel, pursuant to block 308.

Figure 4:
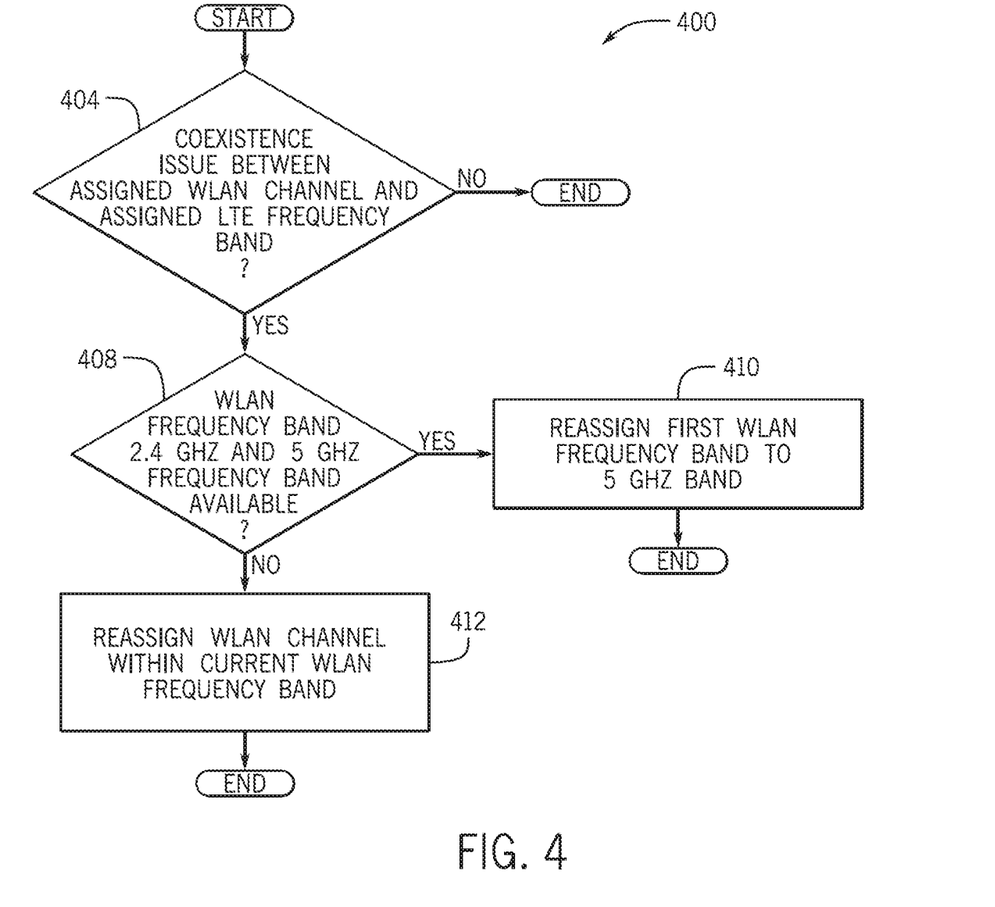

More specifically, referring to FIG. 4 in conjunction with FIG. 1, in accordance with some implementations, the coexistence management engine 150 may use a technique 400. The technique 400 includes determining (decision block 404) whether a coexistence issue exists between an assigned WLAN channel and assigned LTE frequency band. If so, the technique 400 includes determining (decision block 408) whether the currently assigned WLAN frequency band is the 2.4 GHz band and if so, whether the band can be reassigned to the 5 GHz band. If so, then the WLAN frequency band is reassigned to the 5 GHz frequency band, pursuant to block 410. Otherwise, if the WLAN frequency band cannot be reassigned (decision block 408), the technique 400 includes, within the current WLAN frequency band, reassigning (block 412) the WLAN channel.

Figure 5:
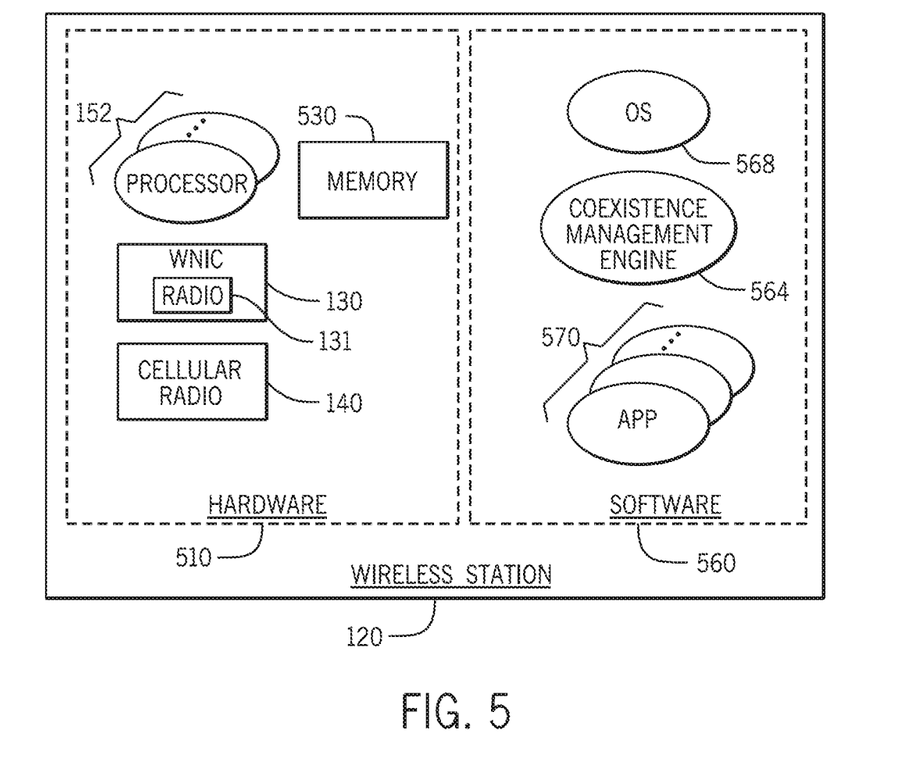
FIG. 5 is a schematic diagram of the wireless station of FIG. 1 according to an example implementation.

In accordance with some implementations, the coexistence management engine 150 may be formed from dedicated hardware or circuitry, such as an application specific integrated circuit (ASIC). In accordance with further example implementations, the coexistence management engine may be formed by a microprocessor executing machine executable instructions. In this manner, referring to FIG. 5 in conjunction with FIG. 1, in accordance with example implementations, the coexistence management engine 150 may be a hardware processor-based device. More specifically, as depicted in FIG. 5, in accordance with some implementations, the wireless station 120 may include hardware 510 and software 560. The hardware 510 may include the one or multiple hardware processors 152 (processing cores, for example) and a memory 530. As an example, the memory 530 may be a non-transitory storage medium formed from semiconductor storage devices, phase change memories, memristors, and so forth.

The hardware components may further include the WNIC 130, the cellular radio 140, other network interfaces, input/output (I/O) devices, display, and so forth. The software 560 of the wireless station 120 may include, for example, instructions 564, which when executed by one or multiple processors 152 cause the processor(s) 152 to perform one or more parts of the techniques 300 and 400. For example, in accordance with some implementations, the instructions 564, when executed by one or multiple processor(s) 152, may cause the processor(s) 152 to identify a cellular communication frequency band being used by the wireless station 120: and based on the identified cellular communication frequency band being used by the wireless station 120, regulate assignment of a WLAN communication channel for the station 120 to inhibit interference due to the concurrent use of the cellular communication frequency band and WLAN communication channel. The wireless station 120 may include other software, such as instructions 568, which when executed by one or multiple processor 152 cause the processor(s) 152 to provide an operating system, one or multiple sets 570 of machine executable instructions, which when executed by one or multiple processor(s) 152 cause the processor(s) 152 to provide one or multiple applications, and so forth.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   identifying a cellular communication frequency band and a wireless local area network (WLAN) communication channel being concurrently used by a wireless station; and
   based on the identified cellular communication frequency band and WLAN communication channel, regulating assignment of the WLAN communication channel to inhibit interference due to the concurrent use of the cellular communication frequency band and the WLAN communication channel, wherein the regulating of the assignment comprises:
     using the wireless station to determine whether to reassign the WLAN communication channel, and
     reassigning the WLAN communication channel from a first channel to a second channel, the first and second channels being associated with a common frequency band, and
   wherein:
     the cellular communication frequency band comprises a Long Term Evolution (LTE) frequency division duplexing (FDD) Band 7;
     the common frequency band comprises a 2.4 GigaHertz (GHz) frequency band;
     the first channel comprises channel six, channel eleven, channel twelve, channel thirteen or channel fourteen in the 2.4 GHz frequency band; and
     the second channel comprises channel one in the 2.4 GHz frequency band.

2. The method of claim 1, wherein the first channel is closer in frequency to the cellular communication frequency band than the second channel.

3. A method comprising:
   identifying a cellular communication frequency band and a wireless local area network (WLAN) communication channel being concurrently used by a wireless station; and
   based on the identified cellular communication frequency band and WLAN communication channel, regulating assignment of the WLAN communication channel to inhibit interference due to the concurrent use of the cellular communication frequency band and the WLAN communication channel, wherein the regulating of the assignment comprises:
     using the wireless station to determine whether to reassign the WLAN communication channel, and
     reassigning the WLAN communication channel from a first channel to a second channel, the first and second channels being associated with a common frequency band, and
   wherein:
     the cellular communication frequency band comprises a Long Term Evolution (LTE) time division duplexing (TDD) Band 40;
     the common frequency band comprises a 2.4 GigaHertz (GHz) frequency band;
     the first channel comprises channel one or channel six in the 2.4 GHz frequency band; and
     the second channel comprises channel eleven, channel twelve, channel thirteen or channel fourteen in the 2.4 GHz frequency band.

4. The method of claim 3, wherein the first channel is closer in frequency to the cellular communication frequency band than the second channel.

5. An article comprising a non-transitory computer readable storage medium to store instructions that when executed by a computer cause the computer having a cellular radio and a wireless local area network (WLAN) radio to:
based on a cellular communication frequency band assigned to the cellular radio and a first WLAN communication channel assigned to the WLAN radio for communications, determine whether to reassign the first WLAN communication channel to inhibit interference of the WLAN radio due to the cellular communication frequency band; and
based at least in part on a result of the determination:
determine whether the communications of the computer can be transitioned from a first WLAN frequency band to a second WLAN frequency band,
in response to determining that the communications of the computer can be transitioned from the first WLAN frequency band to the second WLAN frequency band, reassign the WLAN radio from the first WLAN frequency band to the second WLAN frequency band, and
in response to determining that the communications of the computer cannot be transitioned from the first WLAN frequency band to the second WLAN frequency band, reassign the WLAN radio from the first WLAN communication channel in the first WLAN frequency band to a second WLAN communication channel in the first WLAN frequency band.

6. The article of claim 5, wherein the first WLAN frequency band is a 2.4 gigahertz (GHz) band, and the second WLAN frequency band is a 5 GHz band.

7. The article of claim 5, wherein the first WLAN frequency band is a 5 gigahertz (GHz) band, and the second WLAN frequency band is a 2.4 GHz band.

8. The article of claim 5, wherein the cellular communication frequency band is a Long Term Evolution (LTE) frequency band.

9. The article of claim 5, wherein a determination to reassign the WLAN communication channel to inhibit interference is based on a rule.

10. The article of claim 5, wherein a determination to reassign the WLAN communication channel to inhibit interference is based on measurements indicative of interference between the cellular radio and the WLAN radio.

11. A wireless station comprising:
a first radio to communicate with a cellular network;
a second radio to communicate with an access point of a wireless local area network (WLAN); and
a processor to:
determine that a cellular communication frequency band of the first radio cannot coexist with a first WLAN communication channel of the second radio; and
in response to the determining:
determine whether communications of the wireless station can be transitioned from a first WLAN frequency band to a second WLAN frequency band,
in response to determining that the communications of the wireless station can be transitioned from the first WLAN frequency band to the second WLAN frequency band, reassign the second radio from the first WLAN frequency band to the second WLAN frequency band, and
in response to determining that the communications of the wireless station cannot be transitioned from the first WLAN frequency band to the second WLAN frequency band, reassign the second radio from the first WLAN communication channel in the first WLAN frequency band to a second WLAN communication channel in the first WLAN frequency band.

12. The wireless station of claim 11, wherein the cellular network comprises a Long Term Evolution (LTE) network, and the WLAN comprises a network associated with communications in an industrial, scientific and medical (ISM) frequency band.

13. The wireless station of claim 11, wherein the first WLAN frequency band is a 2.4 gigahertz (GHz) band, and the second WLAN frequency band is a 5 GHz band.

14. The wireless station of claim 11, wherein the first WLAN frequency band is a 5 gigahertz (GHz) band, and the second WLAN frequency band is a 2.4 GHz band.

15. The wireless station of claim 11, wherein the determining that the cellular communication frequency band of the first radio cannot coexist with the first WLAN communication channel of the second radio is based on a rule.

16. The wireless station of claim 11, wherein the determining that the cellular communication frequency band of the first radio cannot coexist with the first WLAN communication channel of the second radio is based on measurements indicative of interference between the first radio and the second radio.

* * * * *